Jan. 14, 1958  R. E. CHEROUVRIER  2,819,648
APPARATUS FOR VIEWING, READING AND PROJECTING
MICROFILMS AND LIKE DOCUMENTS
Filed Dec. 14, 1955
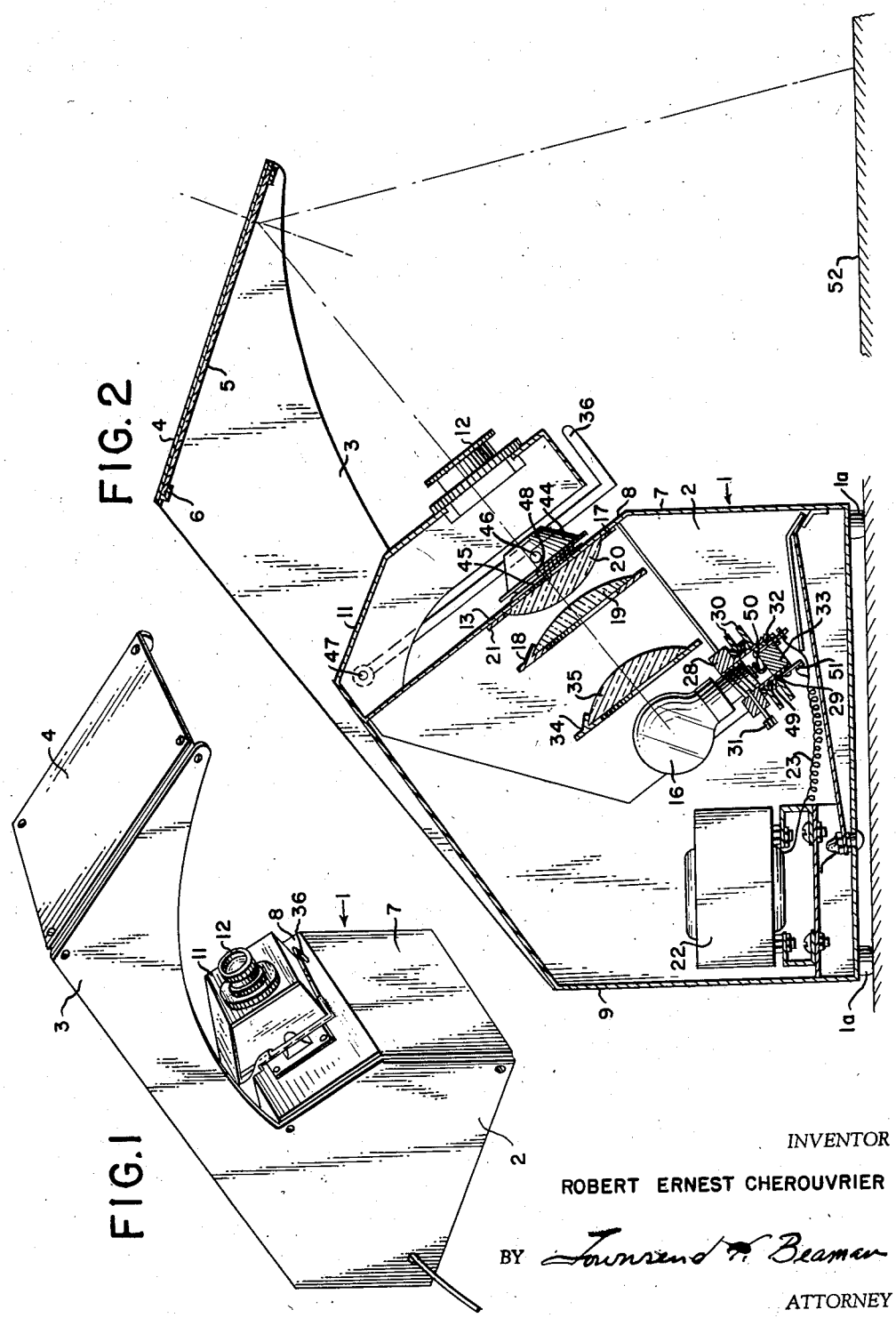
INVENTOR
ROBERT ERNEST CHEROUVRIER
BY *Townsend F. Beaman*
ATTORNEY United States Patent Office 2,819,648
Patented Jan. 14, 1958

2,819,648

APPARATUS FOR VIEWING, READING AND PROJECTING MICROFILMS AND LIKE DOCUMENTS

Robert Ernest Cherouvrier, Paris, France

Application December 14, 1955, Serial No. 553,134

6 Claims. (Cl. 88—24)

This invention relates to improvements in appliances for viewing, reading and reproducing microfilms and documents, generally, of the kind which employ a light source in conjunction with a lens system and objective and a reflector mirror, provision being made to support the document, to be viewed or reproduced, between the objective and reflector mirror.

Known appliances of the above kind, sometimes known as episcopes, are generally cumbersome, unduly large, intricate and expensive to manufacture.

It is an object of the present invention to provide an appliance of the above kind which is of lighter weight, cheaper to manufacture and which enables documents to be read, viewed or reproduced without blurr or vibration.

Another object of the invention is to provide an appliance of the above kind which, due to the inherent construction of the casing and structure for supporting the optical lenses, objective and reflector mirror, enables these parts to be properly positioned in as stable a manner as is possible.

Yet another object of the invention is to provide an appliance of the above kind having improved mounting structure for supporting the entire optical system, which permits ready adjustment of this system in a single operation for obtaining the correct projection axis, and this with the use of a common carrier.

The above and further objects and advantages of the invention, residing in the construction, arrangement and combination of parts, will appear clear from consideration of the following description of one practical form of the invention, given by way of example, with reference to the accompanying drawings, and from the appended claims.

In the drawings,

Figure 1 is a perspective view of the appliance according to the invention, and

Figure 2 is a central vertical longitudinal sectional view of Figure 1.

The appliance shown in the drawing comprises a casing 1 made of suitably cut sheet metal of sufficient thickness to provide the required rigidity and advantageously covered by a frosted paint, which gives the appliance a satisfactory appearance. The casing 1 is mounted on suitable casters 1a. The two side walls 2 of the casing 1 extend upwardly to form parallel supporting arms 3 interconnected at their upper ends by a plate 4 which supports a mirror 5 held in position by downwardly folded lugs 6 formed integral with said plate 4, or suitably connected thereto, preferably with interposed wedge plates of cork, rubber, or equivalent material. The front wall 7 of the casing is folded upon itself, by stamping, so as to provide an upwardly directed land or table surface 8. The casing is closed at the rear and upper portion by walls 9, 10 which are hinged to the other parts of the casing and define an opening through which access may be gained to the parts contained within the casing.

Upon the casing 1, which forms the cladding of the appliance, there is mounted a cowl 11 carrying the optical system of the appliance, the focusing objective 12 being mounted on the transverse limb thereof. This cowl 11 has the shape of a bail member constituted by a rigid piece of sheet metal folded upon itself and connected to the upper inclined land or table surface 8 of the casing 1. The cowl 11 has limbs substantially of the same length braced by small ported supporting plates acting as carriers for the lenses of the optical condenser. In the embodiment of the invention as shown there are three lenses 19, 20 and 35. The outer lenses 20 and 35 have a relatively small radius of curvature, while the middle lens 19 has a larger radius of curvature. Such lenses are held in position by centralizing prongs which ensure a correct and accurate positioning in a simple and swift way. The small supporting plates are provided with lugs engaged through corresponding slots formed in the limbs of the cowl 11. The use of an optical condenser made up of three lenses of the aforesaid type permits a microfilm of larger sized image to be nicely illuminated just as a microfilm having no side holes.

The upper face of the land or table surface 8 of the casing 1 carries a stationary glass pane 45 which constitutes the lower element of the film presser of the appliance. Such glass pane 45 is held in position on the casing 1 by a pair of crimped lugs and a pair of centralizing pins. The upper element of the film presser comprises a body portion 44 secured by a screw 46 to a yoke-shaped carrier 36 pivotally supported at 47 upon the optical cowl 11 and urged downwardly by a pair of torsion springs (not shown). The body portion 44 of the film presser receives a small glass plate 48 adapted to rest upon the film interposed between it and the stationary pane 45. Such glass plate 48 is removably secured to the body portion 44 by a pair of flat springs.

The film presser is arranged in the plane in which extends a wide port formed in the limbs of the rigid supporting cowl 11. This port is so sized as to also permit microfilms of any size to be received therein.

On the drawing 22 indicates a transformer connected with the lamp 16 by a lead 23 for feeding current of the required voltage. This transformer permits the appliance to be used with different input voltages.

In order to permit an adjustment of the position of the punctual filament of the lamp 16 which illuminates the microfilm, there is provided an adjustable carrier device comprising a small bar 49 made of an insulating material secured to the optical cowl 11 and slidably receiving through an elongated slot a screw-threaded socket 29 carrying the lamp 16 and including a thicker upper collar 28 into which a screw 31 is set for locking the lamp 16 in position. Knurled nuts 30 arranged on the opposite sides of the insulating bar 49 permit the position of the socket 29 and consequently of the lamp 16 with respect to the bar 49 to be adjusted. Flats (not shown) are provided for holding the socket 29 against rotation while providing a clearance which permits the lamp 16 to be adjusted sidewise to a certain extent. The screw-threaded socket 29 is closed at its lower end by an insulating plug 33 through which is engaged a terminal 32 to which is connected one of the leads 23 from the transformer 22. Contact with the lamp is established by a spring blade 50 connected to said terminal 32. The other lead 23 is directly connected to the socket 29 by a lug 51.

It will be seen that, owing to this novel arrangement, mere screwing up or unscrewing of the knurled nuts 30 permits the punctiform filament of the lamp 16 to be exactly aligned with the optical axis of the system, thereby providing adequate focusing of the resultant image.

Use of this appliance has established that, while of relatively simple and cheap construction, it is possible to obtain, with sufficient magnification and with perfect clearness and luminosity, prints on photographic paper, or photo copies, of microfilms or documents. When the appliance is in use the light rays emitted from the lamp 16 pass through the condenser lenses 19, 20 and 35, then through the transparency pressed upon the glass panel 45 by the film presser 44, to be projected from the objective 12 upon the mirror 5, which reflects the light toward a screen, such as a table top 52, for viewing.

Owing to its simple construction and to its perfect stability, this appliance is particularly suitable for use on a table or desk for examining archives, scientific, or other documents.

While the appliance has been described and illustrated as adapted for furnishing an image in a horizontal plane, it also permits a vertical wall projection of the document or microfilm to be obtained when the appliance is supported on its rear wall 9. It is also possible to provide the side walls 2 of the casing 1 with removable or hinged arms provided with axles for the engagement and supporting of microfilms in rolled form.

What is claimed is:

1. In an appliance for viewing, reading and reproducing microfilms and other documents comprising a casing having an inclined upper surface for receiving the microfilm, means for holding the microfilm, an optical system including an objective, a multiple lens condenser and a light source and a mirror rigidly connected to said casing, a rigid supporting cowl forming an optical frame fixed to said upper surface, the transverse limb of said cowl extending upwardly and supporting the objective while its side limbs extend in vertical planes, brace plates interconnecting said side limbs, ports in said brace plates, lenses covering said ports, lens-holding prongs over said ports in true optical alignment, slots in the side limbs of the cowl, lugs carried by said brace plates and engaged through said slots, and adjustable means carrying the light source and secured to said side limbs.

2. An appliance for viewing, reading and reproducing microfilms according to claim 1, comprising a set of three plano-convex lenses each of which is secured to one of the brace plates, the middle lens having a relatively large radius of curvature while the outer lenses have a relatively small radius of curvature.

3. An appliance for viewing, reading and reproducing microfilms according to claim 2, wherein the side limbs of the supporting cowl are provided just over the inclined land surface of the casing with a port of large size extending in the plane of the microfilm-holding means for permitting the microfilm and microfarads to be passed therethrough.

4. In an appliance for viewing, reading and reproducing microfilms and like documents comprising a casing having an inclined upper land surface for receiving the microfilm, an optical system including an objective, a multiple lens condenser and a light source and a mirror rigidly connected to said casing, a rigid supporting cowl forming an optical frame and secured to the upper inclined land surface of the casing, the transverse limb of said cowl extending upwardly and carrying the objective while its side limbs extend in vertical planes, small brace plates for mounting the lenses of the optical condenser, adjustable means carrying the light source and secured to said side limbs, a port in the upper land surface of the casing, a glass pane covering said port and acting as a rest surface for the microfilm, a rigid wire yoke member hinged to the side limbs of the cowl over said land surface, an upper film presser secured to said yoke member, a glass pane mounted upon said presser and resting upon the microfilm for holding it down, and spring means elastically applying said upper glass pane against the subjacent glass pane which clamps the microfilm.

5. In an appliance for viewing, reading and reproducing microfilms and like documents comprising a casing having an upper inclined land surface for receiving the microfilm, means for holding down the microfilm, an optical system including an objective, a multiple lens condenser and a light source having a punctiform filament and a mirror rigidly connected to said casing, a rigid supporting cowl made of sheet metal forming an optical frame secured to said upper land surface of the casing, the transverse limb of the cowl extending upwardly and carrying the objective while its side limbs extend in vertical planes, small brace plates interconnecting said side limbs for forming a rigid assembly, the lenses of the optical condenser being secured to said brace plates, a rest surface for the microfilm provided on said upper land surface, an upper film presser hinged to the supporting cowl over said inclined land surface, and adjustable supporting means for the light source so as accurately to align its punctiform filament with the optical axis of the system carried by the rigid supporting cowl.

6. An appliance for viewing, reading and reproducing microfilms and like documents according to claim 5 wherein the adjustable means supporting the light source include an insulating bar mounted upon the side limbs of the rigid supporting cowl, an elongated slot being formed in said bar, a screw-threaded socket being engaged through said slot, nuts being screwed upon the socket and being abutted on the opposite sides of the bar for locking said socket in the required position on said bar, a lamp having a punctiform filament set into the socket, means for holding the lamp in the socket, and electrical connecting means leading to the socket and central terminal of said lamp.

References Cited in the file of this patent

UNITED STATES PATENTS

| | | |
|---|---|---|
| 1,428,347 | Van Altena | Sept. 5, 1922 |
| 1,447,403 | Atherton | Mar. 6, 1923 |
| 2,258,382 | Goebel | Oct. 7, 1941 |
| 2,292,966 | Osterberg | Aug. 11, 1942 |
| 2,301,415 | Koehl | Nov. 10, 1942 |
| 2,562,297 | Cordonnier | July 31, 1951 |
| 2,712,266 | Cherouvrier | July 5, 1955 |

FOREIGN PATENTS

| | | |
|---|---|---|
| 892,175 | France | Jan. 3, 1944 |